United States Patent [19]

Wolf et al.

[11] 4,217,103
[45] Aug. 12, 1980

[54] DYESTUFF FORMULATIONS CONTAINING SALTS OF DIARYL ETHER SULFONIC ACIDS

[75] Inventors: Karlheinz Wolf; Hans-Heinz Mölls; Reinhard Nebeling; Hans-Werner Petroll, all of Leverkusen; Reinhold Hörnle, Cologne; Richard Schwaebel, Leverkusen; Vaclav Kaspar, Cologne, all of Fed. Rep. of Germany

[73] Assignee: Bayer Aktiengesellschaft, Leverkusen, Fed. Rep. of Germany

[21] Appl. No.: 945,001

[22] Filed: Sep. 22, 1978

[30] Foreign Application Priority Data

Sep. 24, 1977 [DE] Fed. Rep. of Germany ....... 2743066

[51] Int. Cl.² .................. D06P 1/12; C09B 27/00; D06P 1/39; D06P 1/62
[52] U.S. Cl. .................................. 8/66; 8/665; 8/666; 8/584; 8/588; 8/491; 8/433
[58] Field of Search ............... 8/89 R, 173, 175, 44, 8/46, 45; 260/512 R

[56] References Cited

U.S. PATENT DOCUMENTS

| T661820 | 2/1969 | Brooks. | |
|---|---|---|---|
| 2,081,876 | 5/1937 | Prahl | 260/512 R |
| 3,684,426 | 8/1972 | Bindler et al. | 8/173 |

FOREIGN PATENT DOCUMENTS

| 747842 | 9/1970 | Belgium | 8/173 |
|---|---|---|---|
| 1196532 | 6/1970 | United Kingdom | 8/89 |

OTHER PUBLICATIONS

Chem. Abstracts, vol. 30, 4876-6 (1936).

*Primary Examiner*—Joseph L. Schofer
*Assistant Examiner*—Maria S. Tungol
*Attorney, Agent, or Firm*—Sprung, Felfe, Horn, Lynch & Kramer

[57] ABSTRACT

Dyestuff formulations which contain anionic, water-soluble dyestuffs or developable dyestuffs and salts of diaryl ether-sulphonic acids are suitable for the preparation of padding liquors, dyebaths and printing pastes.

4 Claims, No Drawings

DYESTUFF FORMULATIONS CONTAINING SALTS OF DIARYL ETHER SULFONIC ACIDS

The invention relates to dyestuff formulations which contain anionic, water-soluble dyestuffs or developable dyestuffs and salts of diaryl ether-sulphonic acids, the preparation of these dyestuff formulations and their use for the preparation of padding liquors, dyebaths and printing pastes.

Possible anionic, water-soluble dyestuffs are dyestuffs which contain, as the group conferring water-solubility, the COOH group, but preferably the $SO_3H$ group, or salts thereof, and 1:1 or, in particular, 1:2 metal complex dyestuffs, such as 1:1 nickel complexes, 1:1 cobalt complexes, 1:1 copper complexes, 1:1 chromium complexes or symmetric or asymmetric 1:2 cobalt complexes or 1:2 chromium complexes of, in particular, o-carboxy-o'-hydroxy-azo or o,o'-dihydroxy-azo dyestuffs of the benzene-azo-benzene, naphthalene-azo-naphthalene, benzene-azo-naphthalene, benzene-azo-pyrazole or benzene-azo-acetoacetamide type.

Examples of possible acid dyestuffs are phthalo-cyanine dyestuffs, nitro dyestuffs, di- or tri-aryl-methane dyestuffs, oxazine dyestuffs, thiazine dyestuffs, dioxazine dyestuffs, xanthene dyestuffs and anthraquinone dyestuffs, and preferably azo dyestuffs of the monoazo, diazo and polyazo series. In addition, dyestuffs which contain fibre-reactive groups in the molecule are preferred. Those fibre-reactive dyestuffs which are employed in printing are very particularly preferred.

Dyestuffs containing fibre-reactive groups are described, for example, by E. Siegel in "Chimia" (Supplementum 1968) pages 100–114 and K. Venkataraman in "The Chemistry of Synthetic Dyes" (1972) Volume VI.

Of these dyestuffs, the dyestuffs of German Patent 1,544,499 and DT-OS (German Published Specification) 1,644,171 may be mentioned in particular.

Developable dyestuffs are described, for example, in the Colour Index (2nd edition), Volume 2, pages 2,569–2,678 and in Ullmanns Encyklopädie der technischen Chemie (Ullmanns Encyclopaedia of Industrial Chemistry) (4th edition), Volume 8, pages 286–297, combinations of diazoamino compounds with Naphthol AS components (pages 295–296) being preferably employed for the dyestuff formulations according to the invention.

Possible salts of diaryl ether-sulphonic acids are, in particular, the salts of the general formula

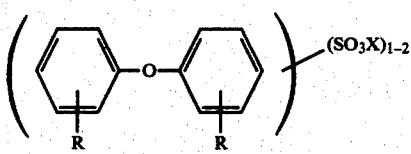

wherein
R represents hydrogen or methyl,
X represents lithium, potassium, sodium or $N(R')_4$ and
R' represents hydrogen, $C_1$–$C_4$-alkyl or $(CH_2$—$CH_2$—$O)_{1-3}H$.

These salts are prepared in accordance with customary processes by sulphonation of diaryl ethers and subsequent neutralisation of the products with alkalis, such as the corresponding alkali metal hydroxide solutions or alkali metal carbonates, ammonia or the corresponding amines, preferably sodium hydroxide solution.

Preferably, 1 mol of diphenyl ether or ditolyl ether in the form of its possible isomers, but very particularly preferably the isomers with $-CH_3$ in the 2,2'-, 2,3'-, and 3,3'-position, such as are obtained in the form of an isomer mixture as by-products in the preparation of cresols, is sulphonated with 1–3 mols of sulphuric acid, preferably 1.8–2.3 mols of sulphuric acid, at temperatures of 60°–180° C., preferably at 80°–120° C. Sulphonation products with a salt content of less than 10%, preferably of less than 5%, are preferred.

The end products is dried, preferably spray-dried, for its intended use.

The dyestuff formulations preferably contain 3–85% by weight of the salt of a diaryl ether-sulphonic acid, in particular 5–60% by weight.

In addition to the salts according to the invention, the formulations can contain further additives, such as customary formulating agents, such as dextrin, urea, sugar, inorganic salts, such as sodium chloride, sodium sulphate, sodium carbonate and trisodium phosphate, anionic surface-active agents, such as lignin-sulphonic acids, alkyl-sulphuric acids, alkylnaphthalenesulphonic acid or alkylbenzenesulphonic acids and salts thereof, non-ionic surface-active agents, such as adducts of ethylene oxide and long-chain alcohols or alkylphenols, as well as anti-dusting agents, such as oil/emulsifier mixtures, or phthalic acid esters.

For the preparation of the dyestuff formulations, the dry dyestuffs are mixed with the dry salts, according to the invention, of the sulphonic acids and the mixture is ground, or the ground components are mixed. However, the aqueous dispersions or, preferably, solutions of the two components can also be dried and the solid ground, or, preferably, they can be spray-dried using one-material nozzles or two-material nozzles or whirler discs.

Compared with the known formulating agents, the salts according to the invention have the advantage that they do not impair the action of the levelling agents and, in the case of dyestuffs with fibre-reactive groups, do not react with the dyestuff. In addition, the solubility of the dyestuffs is improved without the surface tension of the dyestuff solutions being lowered. An undesired formation of foam in the dyebath is thereby avoided.

The dyestuff formulations, especially those with dyestuffs containing fibre-reactive groups, are particularly advantageously suitable for the preparation of printing pastes, in particular for the preparation of printing pastes based on emulsions, both of the water-in-oil type and of the oil-in-water type.

The Colour Index numbers indicated in the examples relate to the 3rd edition (1971).

EXAMPLE 1

78 g of the dyestuff of the formula

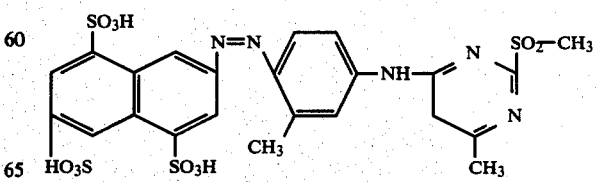

are ground and mixed with 20 g of the ditolyl ether-sulphonate prepared according to Example 11 and 2 g of an oil/emulsifier mixture consisting of 8 parts by weight of white oil and 2 parts by weight of the addition product of nonylphenol and 6 mols of ethylene oxide.

A dyestuff mixture is obtained, which is very suitable for printing and dyeing, in a yellow colour shade, textiles made of cellulose fibres. Good results are also achieved if a product prepared according to Example 12 is used instead of the ditolyl ether.

EXAMPLE 2

82 g of the 1:2 cobalt complex of the monoazo dyestuff of the formula

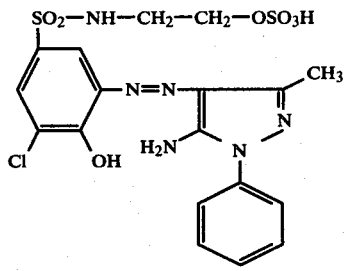

are ground and mixed with 15 g of the ditolyl ether-sulphonate prepared according to Example 11 and 2 g of the oil/emulsifier mixture of Example 1.

EXAMPLE 3

66 g of the dyestuff of the formula

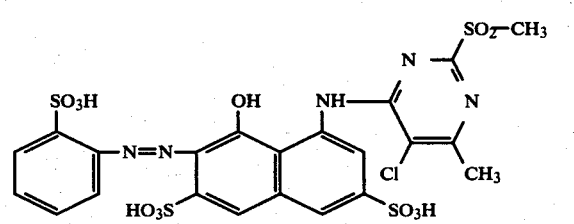

are ground and mixed, as in Example 1, with 34 g of the ditolyl ether-sulphonate prepared according to Example 11.

EXAMPLE 4

78 g of the dyestuff of the formula

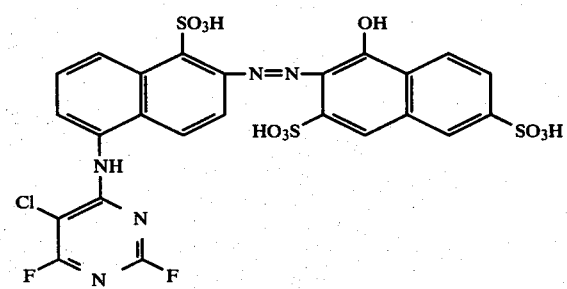

are ground and mixed, as in Example 1, with 22 g of the ditolyl ether-sulphonate prepared according to Example 11.

EXAMPLE 5

30.0 g (1 mol) of the stabilised diazonium salt with the C.I. No. 37,175 and 20.7 g (1 mol) of the naphthol with the C.I. No. 37,585 are ground and mixed with 49.3 g of the ditolyl ether-sulphonate prepared according to Example 11.

A formulation of the developable dyestuff is obtained which is very suitable for dyeing and printing cotton.

EXAMPLE 6

55.5 g (1 mol) of the stabilised diazonium salt with the C.I. No. 37,120, 28.8 g (0.87 mol) of the naphthol with the C.I. No. 37,600, 8.0 g of sodium hydroxide and 7.7 g of the ditolyl ether-sulphonate prepared according to Example 11 are ground and mixed.

EXAMPLE 7

46.0 g (1 mol) of the stabilised diazonium salt with the C.I. No. 37,125, 8.6 g (0.31 mol) of the naphthol with the C.I. No. 37,590 and 15.9 g (0.62 mol) of the naphthol with the C.I. No. 37,595 are ground and mixed with 29.5 g of the ditolyl ether-sulphonate prepared according to Example 11.

EXAMPLE 8

80 g of the dyestuff of the following structure

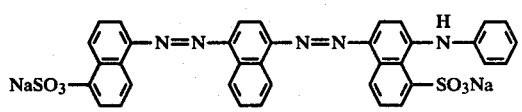

are ground and mixed with 20 g of the ditolyl ether-sulphonate prepared according to Example 11.

A dyestuff formulation is obtained which is very suitable for dyeing wool.

EXAMPLE 9

47 g of the dyestuff with the C.I. No. 14,680, 5 g of LiOH.H$_2$O and 48 g of the ditolyl ether-sulphonate prepared according to Example 11 are ground and mixed.

A dyestuff formulation is obtained which is very suitable for dyeing wool.

EXAMPLE 10

40 g of the green 1:2 chromium mixed complex dyestuff prepared from 1 mol each of the following monoazo dyestuffs:

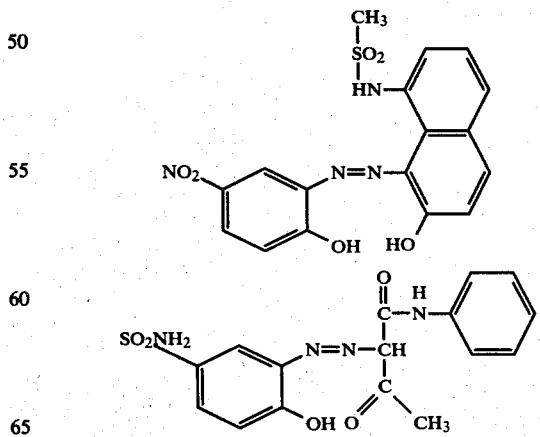

are ground and mixed with 2 g of a di-sec.-butylnaphthalenesulphonate, 5 g of sodium lauryl-sulphonate, 40 g of tri-sodium phosphate and 13 g of the ditolyl ether-sulphonate prepared according to Example 11.

A dyestuff formulation, which is readily soluble in cold and hot water, for dyeing wool is obtained.

EXAMPLE 11

370 g of ditolyl ether (isomer mixture, by-product from the conversion of pure o-chlorotoluene to cresols, containing a predominant proportion of the 2,2'-, 2,3'- and 3,3'-components) are reacted with 386 g of 100% strength sulphuric acid (monohydrate) at about 105° C. for 3 hours, whilst stirring. Titration of 5 g of the product present, diluted with 50 ml of water, with 1-normal-sodium hydroxide solution to a pH value of 6.35 resulted in a 1 N NaOH consumption of about 32 ml. The resulting reaction mixture of ditolyl ether-sulphonic acid is cooled to about 70° C. and diluted with 1,000 ml of water. The product is neutralised, starting at about 50° C., to a pH value of about 7 with 390 g of 50% strength sodium hydroxide solution. The resulting reaction mixture is spray-dried. Yield: about 690 g of ditolyl ether-sulphone salt powder.

EXAMPLE 12

198 g of ditolyl ether (isomer mixture, by-product from the conversion of chlorotoluene-50 (about 50% pure o-chlorotoluene) to cresols) are reacted with 206 g of 100% strength sulphuric acid (monohydrate) at about 105° C. for 3 hours, whilst stirring. Titration of 5 g of the product present, diluted with 50 ml of water, with 1-normal sodium hydroxide solution to a pH value of 6.35 results in a 1 N NaOH consumption of about 34 ml. The resulting reaction mixture of ditolyl ether-sulphonic acids is cooled to about 70° C. and diluted with about 600 ml of water. The product is adjusted to a pH value of about 7 with about 240 g of 50% strength sodium hydroxide solution, starting at about 50° C. The resulting reaction mixture is spray-dried. Yield: about 320 g of ditolyl ether salt powder.

EXAMPLE 13

80 g of the dyestuff of the following structure

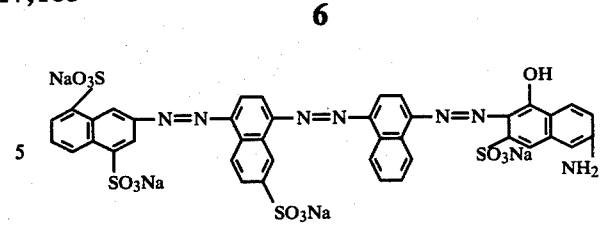

are ground and mixed with 20 g of the ditolyl ether-sulphonate prepared according to Example 11.

A dyestuff formulation, which is readily soluble in cold and hot water, for dyeing cellulose fibres is obtained.

We claim:

1. A dry dyestuff formulation comprising an anionic, water-soluble dyestuff or developable dyestuff and a salt of a diaryl ether-sulphonic acid of the formula

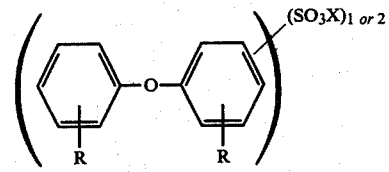

wherein
R is hydrogen or methyl,
X is lithium, potassium, sodium or $N(R')_4$, and
R' is hydrogen, $C_1$–$C_4$-alkyl or $(CH_2-CH_2-O)_n H$
wherein n is 1, 2 or 3.

2. A dyestuff formulation according to claim 1, wherein the diaryl ethersulphonic acid is produced by reacting a diphenyl ether or ditolyl ether with sulphuric acid in the molar ratio 1:1.8–2.3 at 80°–120° C.

3. A dyestuff formulation according to claim 1, wherein the diaryl ethersulphonic acid is produced from an isomeric mixture of ditolyl ethers with —$CH_3$ in the 2,2'-, 2,3'- and 3,3'-position as is obtained in the preparation of cresols.

4. A dyestuff formulation according to claim 1, containing 3–85% by weight of the salt of the diarylsulphonic acid.